US010829999B2

(12) United States Patent
Gledhill et al.

(10) Patent No.: US 10,829,999 B2
(45) Date of Patent: Nov. 10, 2020

(54) POLYCRYSTALLINE DIAMOND COMPACTS HAVING INTERSTITIAL DIAMOND GRAINS AND METHODS OF MAKING THE SAME

(71) Applicants: DIAMOND INNOVATIONS, INC., Worthington, OH (US); BAKER HUGHES, A GE Company LLC, Houston, TX (US)

(72) Inventors: Andrew Gledhill, Westerville, OH (US); Danny Eugene Scott, Montgomery, TX (US); Marc William Bird, Houston, TX (US)

(73) Assignees: DIAMOND INNOVATIONS, INC., Worthington, OH (US); BAKER HUGHES, a GE Company LLC, Houston, TX (US)

( * ) Notice: Subject to any disclaimer, the term of this patent is extended or adjusted under 35 U.S.C. 154(b) by 430 days.

(21) Appl. No.: 15/435,581

(22) Filed: Feb. 17, 2017

(65) Prior Publication Data
US 2017/0234077 A1    Aug. 17, 2017

Related U.S. Application Data

(60) Provisional application No. 62/296,130, filed on Feb. 17, 2016.

(51) Int. Cl.
*B24D 18/00*    (2006.01)
*E21B 10/567*    (2006.01)
(Continued)

(52) U.S. Cl.
CPC ............ *E21B 10/567* (2013.01); *C04B 35/52* (2013.01); *C04B 35/528* (2013.01);
(Continued)

(58) Field of Classification Search
CPC ........ E21B 10/567; E21B 10/54; E21B 10/46; C22B 23/0407; C22C 26/00
See application file for complete search history.

(56) References Cited

U.S. PATENT DOCUMENTS 8,147,790 B1    4/2012    Vail
9,273,381 B2    3/2016    Qian
(Continued)

FOREIGN PATENT DOCUMENTS

WO    2016005314 A1    1/2016

*Primary Examiner* — Pegah Parvini (57) ABSTRACT

Polycrystalline diamond compacts having interstitial diamonds and methods of forming polycrystalline diamond compact shaving interstitial diamonds with a quench cycle are described herein. In one embodiment, a polycrystalline diamond compact includes a substrate and a polycrystalline diamond body attached to the substrate. The polycrystalline diamond body includes a plurality of inter-bonded diamond grains that are attached to one another in an interconnected network of diamond grains and interstitial pockets between the inter-bonded diamond grains, and a plurality of interstitial diamond grains that are positioned in the interstitial pockets. Each of the plurality of interstitial diamond grains are attached to a single diamond grain of the interconnected network of diamond grains or other interstitial diamond grains.

16 Claims, 8 Drawing Sheets

(51) Int. Cl.

| | |
|---|---|
| *C04B 35/645* | (2006.01) |
| *C04B 35/528* | (2006.01) |
| *C04B 35/52* | (2006.01) |
| *C04B 35/63* | (2006.01) |
| *C04B 35/638* | (2006.01) |
| *C04B 35/64* | (2006.01) |
| *C04B 35/653* | (2006.01) |
| *C22B 3/00* | (2006.01) |
| *C22C 26/00* | (2006.01) |
| *C22F 1/10* | (2006.01) |
| *E21B 10/55* | (2006.01) |
| *E21B 10/54* | (2006.01) |

(52) U.S. Cl.
CPC ........ *C04B 35/6303* (2013.01); *C04B 35/638* (2013.01); *C04B 35/64* (2013.01); *C04B 35/645* (2013.01); *C04B 35/653* (2013.01); *C22B 23/0407* (2013.01); *C22C 26/00* (2013.01); *C22F 1/10* (2013.01); *C04B 2235/427* (2013.01); *C04B 2235/5472* (2013.01); *C04B 2235/6562* (2013.01); *C04B 2235/6565* (2013.01); *C04B 2235/661* (2013.01); *C04B 2235/783* (2013.01); *C04B 2235/85* (2013.01); *C22C 2026/006* (2013.01); *E21B 10/54* (2013.01); *E21B 10/55* (2013.01)

(56) References Cited

U.S. PATENT DOCUMENTS

| | | |
|---|---|---|
| 2011/0225896 A1 | 9/2011 | Vail |
| 2013/0067825 A1* | 3/2013 | Scott ................. B24D 3/14 51/307 |
| 2013/0256039 A1 | 10/2013 | Digiovanni et al. |
| 2014/0318027 A1 | 10/2014 | Sani |
| 2016/0193718 A1 | 7/2016 | Digiovanni |
| 2017/0095905 A1 | 4/2017 | Scott et al. |

* cited by examiner

POLYCRYSTALLINE DIAMOND COMPACTS HAVING INTERSTITIAL DIAMOND GRAINS AND METHODS OF MAKING THE SAME

CROSS-REFERENCE TO RELATED APPLICATIONS

None.

BACKGROUND

Polycrystalline diamond ("PCD") compacts are used in a variety of mechanical applications, for example in material removal operations, as bearing surfaces, and in in wire-draw operations PCD compacts are often used in the petroleum industry in the removal of material in downhole drilling. The PCD compacts are formed as cutting elements, a number of which are attached to drill bits, for example, roller-cone drill bits and fixed-cutting element drill bits.

PCD cutting elements typically include a superabrasive diamond body, referred to as a polycrystalline diamond body that is attached to a substrate. The polycrystalline diamond body may be formed in a high pressure high temperature (HPHT) process, in which diamond grains are held at pressures and temperatures at which the diamond particles bond to one another.

As is conventionally known, the diamond particles are introduced to the HPHT process in the presence of a catalyst material that, when subjected to the conditions of the HPHT process, promotes formation of inter-diamond bonds. The catalyst material may be introduced to the diamond particles in a variety of ways, for example, the catalyst material may be embedded in a substrate such as a cemented tungsten carbide substrate having cobalt. The catalyst material may infiltrate the diamond particles from the substrate. Following the HPHT process, the diamond particles may be sintered to one another and attached to the substrate.

While the catalyst material promotes formation of the inter-diamond bonds during the HPHT process, the presence of the catalyst material in the sintered diamond body after the completion of the HPHT process may also reduce the stability of the polycrystalline diamond body at elevated temperatures. Some of the diamond grains may undergo a back-conversion to a softer non-diamond allotrope of carbon (for example, graphite or amorphous carbon) at elevated temperatures. Further, mismatch of the coefficients of thermal expansion between diamond and the catalyst may induce stress into the diamond lattice causing microcracks in the diamond body. Back-conversion of diamond and stress induced by the mismatch of coefficients of thermal expansion may contribute to a decrease in the toughness, abrasion, resistance, and/or thermal stability of the PCD compacts during end-user operation.

It is conventionally known to remove catalyst material from interstitial pockets of the PCD compacts to reduce the stress induced into the diamond lattice and/or to reduce the rate of back-conversion of the diamond, thereby increasing the thermal stability of the PCD cutting element. However, removal of substantially all of the catalyst material from a region of a polycrystalline diamond body may be difficult.

Accordingly, PCD cutting elements having improved thermal stability may be desired.

SUMMARY

In one embodiment, a polycrystalline diamond compact includes a substrate and a polycrystalline diamond body attached to the substrate. The polycrystalline diamond body includes a plurality of inter-bonded diamond grains that are attached to one another in an interconnected network of diamond grains and interstitial pockets between the inter-bonded diamond grains, and a plurality of interstitial diamond grains that are positioned in the interstitial pockets. Each of the plurality of interstitial diamond grains are attached to a single diamond grain of the interconnected network of diamond grains or other interstitial diamond grains.

In another embodiment, a polycrystalline diamond compact includes a substrate and a polycrystalline diamond body attached to the substrate. The polycrystalline diamond body includes a plurality of inter-bonded diamond grains that are attached to one another and interstitial pockets between the inter-bonded diamond grains. At least a portion of the interstitial pockets comprise a catalyst material positioned between the diamond grains. At least a portion of the interstitial pockets comprise an interstitial diamond grain that is positioned within the catalyst material.

In a third embodiment, a method for forming a polycrystalline superabrasive compact includes positioning grains of superabrasive material and a catalyst material in a cell assembly and elevating a temperature of the components of the cell assembly to a first superabrasive sintering temperature that is above a melting or liquidus temperature of the catalyst material. The method also includes, subsequent to reaching the first superabrasive sintering temperature, decreasing the temperature of the components of the cell assembly to a quench temperature that is below the liquidus temperature of the catalyst material. The method further includes, subsequent to reaching the quench temperature, elevating the cell temperature to a second sintering temperature that is above the melting or liquidus temperature of the catalyst material.

BRIEF DESCRIPTION OF THE DRAWINGS

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

The present disclosure is directed to polycrystalline diamond compacts, drill bits incorporating the same, and methods of making the same. A compact made according to the present disclosure may be formed by sintering a plurality of diamond grains to one another in a polycrystalline diamond body that is attached to a substrate. The polycrystalline diamond body includes a plurality of inter-bonded diamond grains that are attached to one another in an interconnected network of diamond grains and interstitial pockets between the inter-bonded diamond grains. The polycrystalline diamond body also includes a plurality of interstitial diamonds that are positioned in the interstitial pockets. In some embodiments, the interstitial diamonds may be attached, directly or indirectly, to a single grain of the inter-bonded diamond grains, such that the interstitial diamonds are attached to one diamond grain of the interconnected network of inter-bonded diamond grains. In other embodiments, the polycrystalline diamond body may also include catalyst material that is positioned in the interstitial pockets between the diamond grains, and an interstitial diamond grain that is positioned within the catalyst material and separated from contact with the interconnected network of inter-bonded diamond grains. Such interstitial diamond grains may be formed during the HPHT sintering process. Formation of such interstitial diamonds may reduce the contact between the interconnected network of inter-bonded diamond grains and the catalyst material and reduce the relative size of the volumes of catalyst material, thereby increasing the thermal stability of the polycrystalline diamond compact.

In certain embodiments, the diamond grains of the polycrystalline diamond body may be bonded to one another in a HPHT sintering process that subjects the unbonded diamond grains to conditions of elevated temperature and pressure in the presence of a molten catalyst material. The unbonded diamond grains may partially dissolve in the molten catalyst material, rearrange due to the elevated pressure, and precipitate out of the catalyst material, such that the diamond grains form an interconnected network of inter-bonded diamond grains that are separated from one another by interstitial pockets between the diamond grains. During an early stage of the sintering process, the HPHT process of embodiments according to the present disclosure may introduce a temperature quenching operation that nucleates diamond grains and/or hard metal grains at positions corresponding to the interstitial pockets between diamond grains. In some embodiments, the nucleated diamond grains and/or hard metal grains may form at positions along the previously unbonded diamond grains. The temperature may subsequently be increased, which increases the rate of inter-diamond bond formation and the rate of growth of precipitated phases in solution with the molten catalyst material. The carbon and/or tungsten that are in solution with the molten catalyst material may precipitate out of solution and collect with the respective nucleated diamond or tungsten carbide grains.

The nucleated diamond grains and/or hard metal grains may be positioned along the surfaces of the inter-bonded diamond grains. The positioning of the nucleated diamond grains and the hard metal grains along the surfaces of the inter-bonded diamond grains may reduce the surface area of contact between the inter-bonded diamond grains and the catalyst material. By reducing the contact between the inter-bonded diamond grains and the catalyst material, the rate of back-conversion from diamond to non-diamond allotropes of carbon may be reduced. Furthers, by reducing the volume of catalyst material within the interstitial volumes of the polycrystalline diamond body, stress induced to the inter-bonded diamond grains due to mismatch in the thermal expansion of the diamond and the catalyst may be reduced. Therefore, polycrystalline diamond compacts according to the present disclosure may exhibit enhanced thermal stability as compared to conventional polycrystalline diamond compacts. Polycrystalline diamond compacts having interstitial diamond, rotary drill bits incorporating the same, and methods of making the same are described in greater detail below.

It is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

Unless otherwise indicated, all numbers expressing quantities of ingredients, properties such as size, weight, reaction conditions and so forth used in the specification and claims are to the understood as being modified in all instances by the term "about". Accordingly, unless indicated to the contrary, the numerical parameters set forth in the following specification and attached claims are approximations that may vary depending upon the desired properties sought to be obtained by the end user. At the very least, and not as an attempt to limit the application of the doctrine of equivalents to the scope of the claims, each numerical parameter should at least be construed in light of the number of reported significant digits and by applying ordinary rounding techniques.

As used herein, the term "about" means plus or minus 10% of the value of the number with which it is being used. Therefore, "about 40" means in the range of 36-44.

As used herein, the term "non-catalyst material" refers to an additive that is introduced to the polycrystalline diamond body, and that is not catalytic with carbon in forming diamond and inter-diamond grain bonds.

Polycrystalline diamond compacts (or "PCD compacts", as used hereafter) may represent a volume of crystalline diamond grains with embedded foreign material filling the inter-granular spaces, referred to herein as interstitial pockets. In one example, a PCD compact includes a plurality of crystalline diamond grains that are bonded to each other by strong inter-diamond bonds and forming a rigid polycrystalline diamond body, and the interstitial pockets, disposed between the bonded grains and filled with a non-diamond material (e.g., a catalyst material such as cobalt or its alloys), which was used to promote diamond bonding during fabrication of the PCD compact. Suitable metal solvent catalysts may include the metal in Group VIII of the Periodic table, for example, cobalt, nickel, iron, or alloys thereof. Polycrystalline diamond compacts (or "PCD compact", as is used hereafter) include the above mentioned polycrystalline diamond body that may be attached to a suitable substrate (for example, cemented tungsten carbide-cobalt (WC-Co)). The attachment between the polycrystalline diamond body and the substrate may be made by virtue of the presence of a catalyst, for example cobalt metal. In other embodiments, PCD compacts may be separate from a substrate. In another embodiment, the polycrystalline diamond body may be bonded to the substrate by brazing. In another embodiment, a PCD compact includes a plurality of crystalline diamond grains that are strongly bonded so each other by a hard amorphous carbon material, for example a-C or t-C carbon. In another embodiment, a PCD compact includes a plurality of crystalline diamond grains, which are not bonded to each other, but instead are bound together by foreign bonding materials such as bonder, nitrides, or carbides, for example, bonded by SiC.

As discussed above, conventional PCD compacts are used in a variety of industries and applications in material removal operations. PCD compacts are typically used in non-ferrous metal or non-metallic material removal operations and in downhole drilling operations in the petroleum industry. Conventional PCD compacts exhibit high toughness, strength, and abrasion resistance because of the inter-granular inter-diamond bonding of the diamond grains that make up the polycrystalline diamond bodies of the PCD compacts. The inter-diamond bonding of the diamond grains of the polycrystalline diamond body are promoted during an HPHT process by a catalyst material. However, the catalyst material and its byproducts that remain present in the polycrystalline diamond body after the HPHT process may, at elevated temperatures, promote back-conversion of diamond to non-diamond allotropes of carbon and may induce stress into the diamond lattice due to the mismatch in the coefficient of thermal expansion of the materials.

It is conventionally known to remove or deplete portions of the catalyst material to improve the thermal stability of the polycrystalline diamond body. The most common method of removing the catalyst material a leaching process in which the PCD compact is introduced to a leaching agent, for example, an aqueous acid solution at elevated temperature. The leaching agent may be selected from a variety of conventionally-known compositions in which the catalyst material is known to dissolve. By dissolving and removing at least a portion of the catalyst material from the PCD compact, the abrasion resistance of the PCD compact may be increased due to the reduction in back-conversion rate of the diamond in the polycrystalline diamond body to non-diamond allotropes of carbon and the reduction in materials having mismatched coefficients of thermal expansion. Removal of such catalyst material from the polycrystalline diamond body is time consuming and expensive, and therefore alternatives have been sought.

Figure 1:
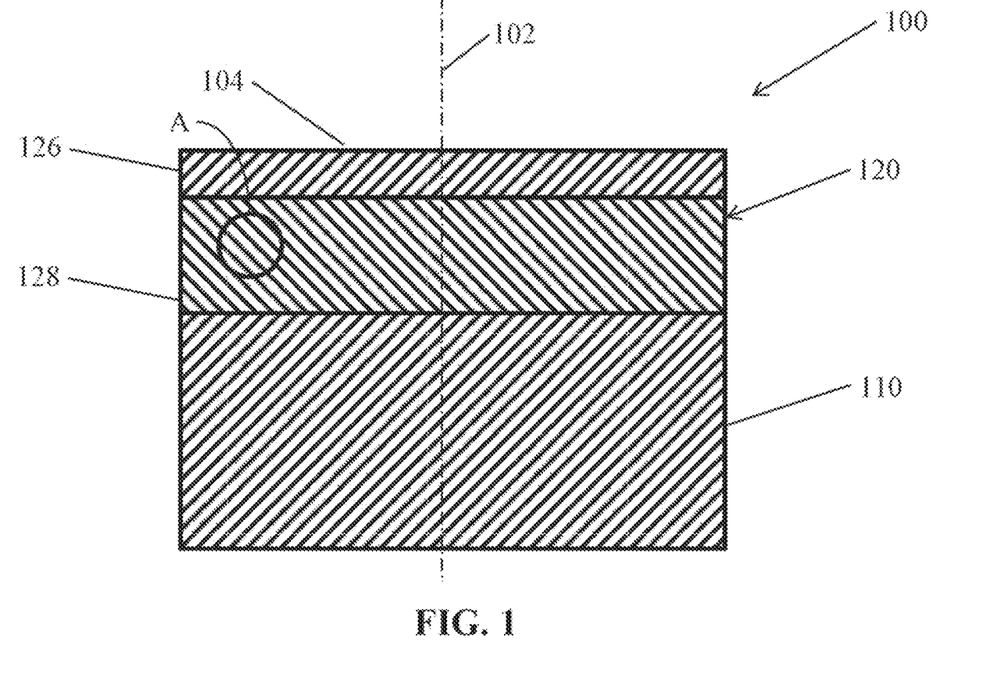
FIG. 1 is a schematic side cross-sectional view of a PCD compact according to one or more embodiments shown or described herein.
Figure 2:
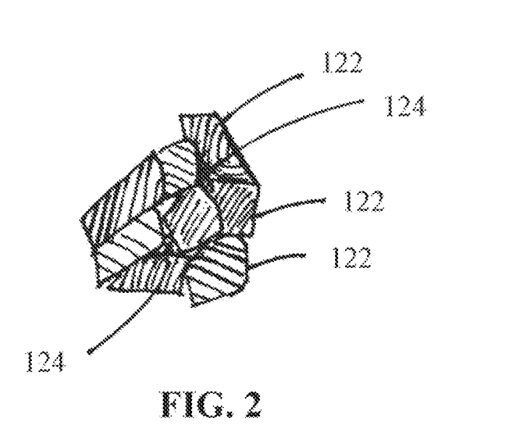
FIG. 2 is a detailed cross-section view of the PCD compact of FIG. 1.

Referring now to FIGS. 1 and 2, a PCD compact is depicted. The PCD compact 100 includes a substrate 110 and a polycrystalline diamond body 120 that is bonded to the substrate 110. The PCD compact 100, the polycrystalline diamond body 120 and the substrate 110 may each be generally cylindrical, and have an axis of symmetry 102 that is positioned to extend through the geometric center of the PCD compact 100. While the diamond body 120 and the substrate 110 of the present disclosure are depicted as being generally cylindrical in shape, it should be understood that the various embodiments may take any of a variety of shapes and configurations, without departing from the scope of the disclosure. The PCD compact may include a working surface 104 that is the exposed surface of the polycrystalline diamond body 110 that is positioned opposite the substrate 110. While the working surface 104 of the present disclosure is depicted as being generally planar, it should be understood that the working surface of various embodiments may take any of a variety of shapes and configurations, without departing from the scope of the disclosure. The polycrystalline diamond body 120 includes a plurality of diamond grains 122 that are bonded to one another, including being bonded to one another through inter-diamond bonding. The bonded diamond grains 122 form an interconnected network of diamond grains 122 that extends along the polycrystalline diamond body 120.

The diamond grains 122, where not inter-bonded with one another, may be separated from one another by interstitial pockets 124. The interstitial pockets 124 may include a variety of materials, including materials remaining from the HPHT sintering process that forms the PCD compacts 100. Examples of such materials include, for example, and without limitation, catalyst material, metal carbides, and carbon in a variety of crystalline or non-crystalline forms. In some embodiments, the PCD compact 100 may be subjected to a leaching process in which portions of the polycrystalline diamond body 100 is brought into contact with a leaching agent that removes catalyst material from the interstitial pockets 124 of the polycrystalline diamond body 100. In such embodiments, the leaching process may form a leached region 126 in which catalyst material is removed in substantial portion from accessible interstitial pockets 124. The polycrystalline diamond body 100 may include an unleached region 128 in which catalyst material remains in the interstitial pockets 124.

Figure 3:
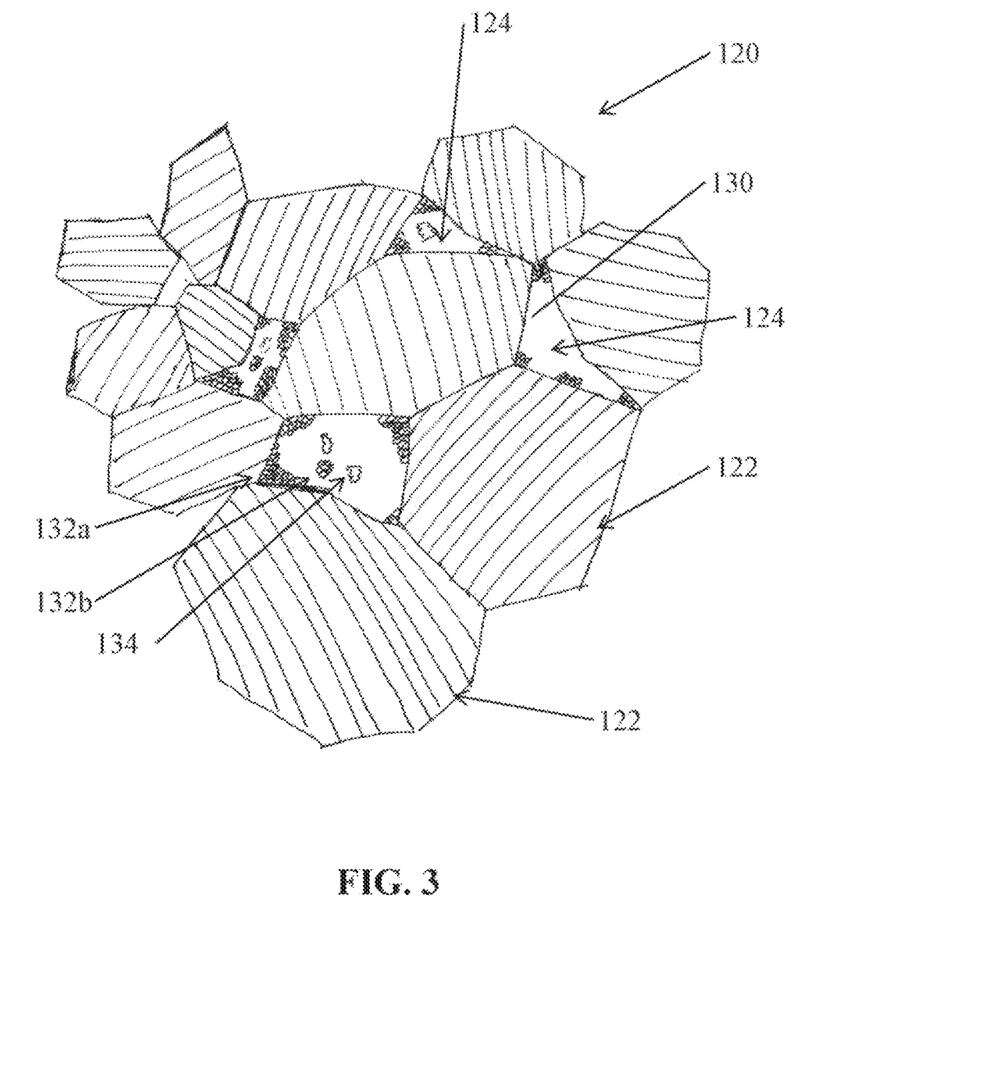
FIG. 3 is a detailed cross-section view of the PCD compact of FIG. 1.

Referring now to FIG. 3, a detailed schematic view of a portion of the polycrystalline diamond body 120 is depicted. The polycrystalline diamond body 120 includes a plurality of inter-bonded diamond grains 122 that are attached to one another in an interconnected network of diamond grains. The inter-bonded diamond grains 122 are each bonded to a plurality of other diamond grains in the interconnected network. The polycrystalline diamond body 120 also includes interstitial pockets 124 between the inter-bonded diamond grains 122. In the embodiment depicted in FIG. 3, the interstitial region 124 includes catalyst material 130, interstitial diamond grains 132a that are attached to the inter-bonded diamond grains 122, interstitial diamond grains 132b that are positioned within the catalyst material 130, metal carbides 134 that are attached to the inter-bonded diamond grams 122, and metal carbides 134 that are positioned within the catalyst material 130.

Still referring to FIG. 3, the interstitial diamond grains 132a that are attached to the inter-bonded diamond grains 122 are each attached, directly or indirectly, to one of the inter-bonded diamond grains 122 or to other interstitial diamond grains 132a. The interstitial diamond grains 132a may not be inter-bonded with more than one of the plurality of the interconnected network of diamond grains 122. Therefore, the interstitial diamond grains 132a are not part of the interconnected network of diamond grains 122. Because the interstitial diamond grains 132a are not inter-bonded with more than one of the plurality of the interconnected network of diamond grains, it can be determined that the interstitial diamond grains 132a were formed in-situ during the HPHT sintering process and not introduced as unbonded diamond particles prior to the HPHT sintering process.

Similarly, the interstitial metal carbides 134 that are attached to the inter-bonded diamond grains 122 are each attached, directly or indirectly, to one of the inter-bonded diamond grains 122 or to other interstitial metal carbides 134.

The interstitial diamond grains 132b and the interstitial metal carbides 134 that are positioned within the catalyst material 130 are spaced apart from the inter-bonded diamond grains 122, and may be at least partially surrounded by catalyst material 130.

The interstitial diamond grains 132 and the interstitial metal carbides 134 may be formed in situ during the HPHT sintering process, as will be described in greater detail below.

PCD compacts that include interstitial diamond grains and/or interstitial metal carbides that are formed within the interstitial pockets between the inter-bonded diamond grains may have reduced quantities of catalyst material that is present in the interstitial pockets between the diamond grains. By reducing the quantity of catalyst material that is present in the interstitial pockets, the stress imparted into the inter-bonded diamond grains by the mismatch in thermal expansion between the catalyst material and the inter-bonded diamond grains can be reduced. By reducing the amount of catalyst material present, the expansion of the catalyst material can be reduced, thereby reducing concentration of stress at locations internal to the interconnected network of diamond grains. The incorporation of interstitial diamond grains and/or interstitial metal carbides may, therefore, increase the wear performance of the PCD compacts at elevated temperatures.

PCD compacts that include interstitial diamond grains and/or interstitial metal carbides that are attached to inter-bonded diamond grains may reduce the surface area of the inter-bonded diamond grains that is in contact with the catalyst material. By reducing contact between the catalyst material and the inter-bonded diamond grains, the rate of back-conversion of the inter-bonded diamond grains to non-diamond allotropes of carbon may be reduced at elevated temperatures as compared to conventional PCD compacts. Reducing the surface area of the inter-bonded diamond grains that is in contact with the catalyst material prevents the catalyst material from encouraging reaction of the diamond grains at elevated temperature, such that the inter-bonded diamond grains are more stable at elevated temperatures than conventional compacts that do not have interstitial diamond grains and/or interstitial metal carbides that maintain spacing between the inter-bonded diamond grains and the catalyst material. The incorporation of interstitial diamond grains and/or interstitial metal carbides may, therefore, increase the wear performance of the PCD compacts at elevated temperatures.

In some embodiments, the polycrystalline diamond body 120 may also include a non-catalyst material that is introduced to the polycrystalline diamond body 120, and is positioned in the interstitial pockets between the inter-bonded diamond grains 122. The non-catalyst material may be selected from a variety of materials, including metals, metal alloys, metalloids, metal-organic composites, semiconductors, low melting temperature metal oxides, glass, and combinations thereof. In particular examples, the non-catalyst material may be lead or bismuth. The non-catalyst material may be introduced to the diamond particles prior to or concurrently whit the HPHT process. The non-catalyst material may be distributed throughout the polycrystalline diamond body 120 evenly or unevenly, as well as by forming a distribution pattern, for example, having a concentration that varies along the longitudinal axis of the PCD cutter element, or having a concentration that varies along the radial direction of the PCD cutter element, or combinations thereof. The non-catalyst material may reduce the amount of catalyst material 130 that is present in the polycrystalline diamond body 120 following the HPHT process.

Figure 4:
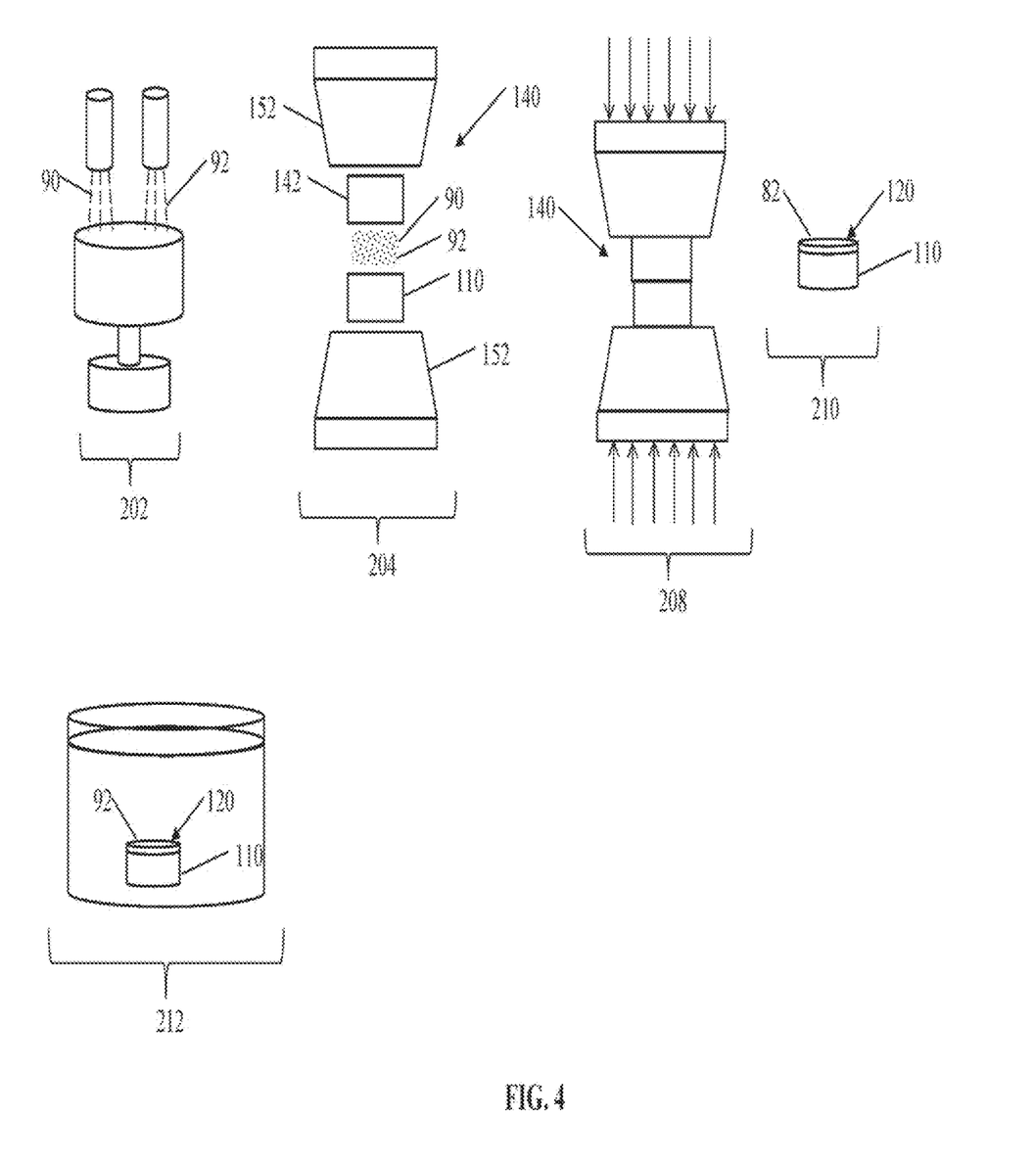
FIG. 4 is a flowchart depicting manufacturing of a PCD compact according to one more embodiments shown or described herein.

Referring now to FIG. 4, a flowchart depicting a manufacturing procedure 200 is provided. In the depleted embodiment, diamond particles 90 are mixed with the non-catalyst material 92 in step 202. It should be understood that diamond particles 90 may also be mixed with catalyst material 130 during step 202. The size of the diamond particles 90 may be selected based on the desired mechanical properties of the PCD compact that is finally produced. It is generally believed that a decrease in grain size increases the abrasion resistance of the PCD compact, but decreases the toughness of the PCD compact. Further, it is generally believed that a decrease in grain size results in an increase in interstitial volume of the PCD compact. In one embodiment, the diamond particles 90 may have a single mode median volumetric particle size distribution (D50) in a range from about 6 µm to about 100 µm, for example having a D50 in a range from about 14 µm to about 50 µm, tor example having a D50 of about 30 µm to about 32 µm. In other embodiments, the diamond particles 90 may have a D50 of about 14 µm, or about 17 µm, or about 30 µm, or about 32 µm. In other embodiments, the diamond panicles 90 may have a multimodal particle size, wherein the diamond particles 90 are selected from two or more single mode populations having different values of D50, including multimodal distributions having two, three, or four different values of D50.

The non-catalyst material 92 may be introduced to step 202 as a powder. In other embodiments, the non-catalyst material 92 may be coated onto the unbonded diamond particles. The particle size of the non-catalyst material may be in a range from about 0.005 µm to about 100 µm, for example being in a range from about 10 µm to about 50 µm.

The diamond particles 90 and the non-catalyst material 92 may be dry mixed with one another using, for example, a commercial TURBULA® Shaker-Mixer available from Glen Mills, Inc. of Clifton, N.J. or an acoustic mixer available from Resodyn Acoustic Mixers, Inc. of Butte, Mont. to provide a generally uniform and well mixed combination. In other embodiments, the mixing particles may be placed inside a bag or container and held under vacuum or in a protective atmosphere during the blending process.

In other embodiments, the non-catalyst material 92 may be positioned separately from the diamond particles 90. During the first part of the HPHT process, the non-catalyst material 92 may "sweep" from their original location and through the diamond particles 90, thereby positioning the non-catalyst material 92 prior to sintering of the diamond particles 90. Subsequent to sweeping of the non-catalyst material 92, the catalyst material 94 may be swept through the diamond particles 90 during the first HPHT process, thereby promoting formation of inter-diamond bonds between the diamond particles 90 and sintering of the diamond particles 90 to form the polycrystalline diamond body 120 of the polycrystalline diamond compact 80.

The diamond particles 90 and the non-catalyst material 92 may be positioned within a cup 142 that is made of a refractory material, for example tantalum, niobium, vanadium, molybdenum, tungsten, or zirconium, as shown in step 204. The substrate 110 is positioned along an open end of the cup 142 and is optionally welded so the cup 142 to form cell assembly 140 that encloses diamond particles 90 and the non-catalyst material 92. The substrate 110 may be selected from a variety of hard phase materials having metal carbides including, for example, cemented tungsten carbide, cemented tantalum carbide, or cemented titanium carbide. The substrate 110 may include a pre-determined quantity of catalyst material 94. Using a cemented tungsten carbide-cobalt system as an example, the cobalt is the catalyst material 94 that is infiltrated into the diamond particles during the HPHT process. In other embodiments, the cell assembly 140 may include additional catalyst material (not shown) that is positioned between the substrate 110 and the diamond particles 90. In further other embodiments, the cell assembly 140 may include non-catalyst material 92 that is positioned between the diamond particles 90 and the substrate 110 or between the diamond particles 90 and the additional catalyst material (not shown).

The cell assembly 140, which includes the diamond particles 90, the non-catalyst material 92, and the substrate 110, is introduced to a press that is capable of and adapted to introduce ultra-high pressures and elevated temperatures to the cell assembly 140 in an HPHT process, as shown in step 208. The press type may be a belt press, a cubic press, or other suitable apparatuses. The pressures and temperatures of the HPHT process that are introduced to the cell assembly 140 are transferred to contents of the cell assembly 140. In particular, the HPHT process introduces pressure and temperature conditions to the diamond particles 90 at which diamond is stable and inter-diamond bonds form. The temperature of the HPHT process may be at least about 1000° C. (e.g., about 1200° C. to about 1800° C., or about 1300° C. to about 1600° C.) and the pressure of the HPHT process may be at least 4.0 GPa (e.g., about 4.0 GPa to about 12.0 GPa, or about 5.0 GPa to about 10 GPa, or about 5.0 GPa to about 8.0 GPa) for a time sufficient for adjacent diamond particles 90 to bond to one another, thereby forming an integral PCD compact having the polycrystalline diamond body 120 and the substrate 110 that are bonded to one another.

An integral PCD compact 82 having a polycrystalline diamond body 120 that is bonded to the substrate 110 may be recovered from the HPHT cell, as depicted in step 120. The introduction of the non-catalyst material 92 to the polycrystalline diamond body 120 prior to the HPHT process may result in a reduction of catalyst material 94 that is present in the polycrystalline diamond body 120 following the HPHT process and prior to initiation of any subsequent leaching process. As compared to conventional compacts that are produced without the introduction of the non-catalyst material 92, unleached diamond bodies 120 produced according to the present disclosure may contain, for example, about 10% less catalyst material when evaluated prior to leaching.

The integral PCD compact 82 may be separated into a plurality of components, including by separating at least a substantial portion of the polycrystalline diamond body 120 from a substantial portion of the substrate 110.

The polycrystalline diamond body 120 may undergo a leaching process in which at least some of the catalyst material is removed from the polycrystalline diamond body 120. In one example of a leaching process, the polycrystalline diamond body 120 is introduced to a leaching agent of an acid bath to remove the remaining substrate 110 from the polycrystalline diamond body 120, as shown in step 212. The leaching process may also remove at least some of the non-catalyst material 92 and catalyst material 94 from the polycrystalline diamond body 120 that is accessible to the acid. Suitable acids may be selected based on the solubility of the non-catalyst material 92 and the catalyst material that is present in the polycrystalline diamond body. Examples of such acids including, for example and without limitation, ferric chloride, cupric chloride, nitric acid, hydrochloric acid, hydrofluoric acid, aqua regia, or solutions or mixture thereof. The acid bath may be maintained at an pre-selected temperature to modify the rate of removal of the non-catalyst material 92 and the catalyst material 94 from the polycrystalline diamond body 120, including being in a temperature range from about 10° C. to about the boiling point the leaching agent. In some embodiments, the acid bath may be maintained at elevated pressures that increase the liquid boiling temperature and thus allow the use of elevated temperatures, for example being at a temperature of greater than the boiling point of the leaching agent at atmospheric pressure. The polycrystalline diamond body 120 may be subjected to the leaching process for a time sufficient to remove the desired quantity of non-catalyst material 92 and catalyst material from the polycrystalline diamond body 120. The polycrystalline diamond body 120 may be subjected to the leaching process for a time that ranges from about one hour to about one month, including ranging from about one day to about 7 days.

Following formation of the integral PCD compact 82, the PCD compact 82 may be processed through a variety of finishing operations to remove excess material from the PCD compact 82 and configure the PCD compact 82 for use by an end user, including formation of a PCD compact 100. Such finishing operations may include, for example, grinding and polishing the outside diameter of the PCD compact 82, cutting, grinding, lapping, and polishing the faces of the PCD compact 82, and grinding and lapping at least one chamfer into the PCD compact 82 between the working surface and the outer diameter of the PCD compact 82. The finishing operations produce a PCD compact with dimensions and surface finishes respired for a particular end-user application.

Figure 5:
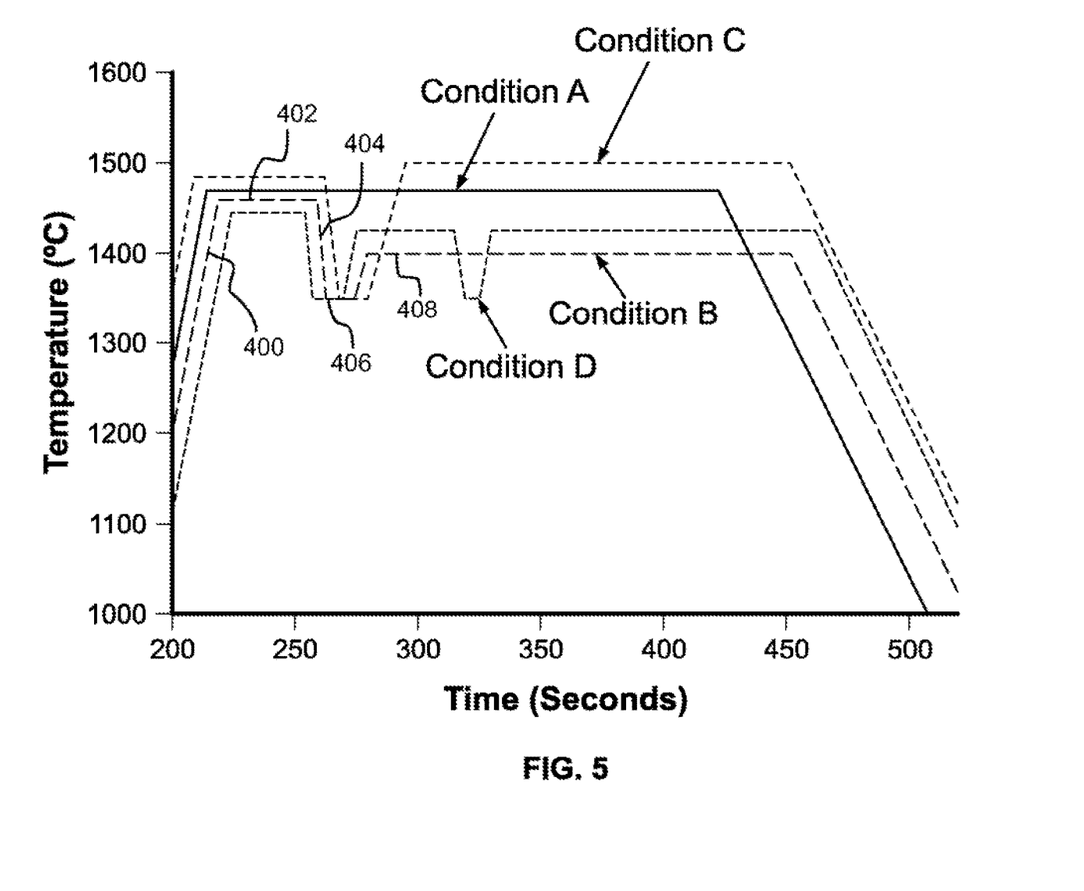
FIG. 5 is a schematic representation of temperature profiles that a cell assembly is subjected to in an HPHT process according to one or more embodiments shown or described herein.

Referring now to FIG. 5, schematic representations temperature profiles of an HPHT process are depicted. While FIG. 5 generically depicts temperature that the cell assembly is subjected to, it should be understood that the direct control of the HPHT process may incorporate measurements that correlate with temperature or pressure, and that direct temperature measurement of the cell assembly during the HPHT process may be unavailable. FIG. 5 includes a temperature profile of a conventional HPHT process (labeled as "Condition A"). In the conventional HPHT process that is depicted, the cell assembly is subjected to increased pressure prior to or coincident with the application of increased temperature. The temperature of the cell assembly is raised to a temperature above the melting or liquidus temperature of the catalyst material that is present in the cell assembly. At this temperature and pressure, the molten catalyst material is pushed into the unbonded diamond panicles and into the interstitial pockets between the diamond particles. Carbon from the diamond particles dissolves in the molten catalyst material. The diamond particles, now held at temperature and pressure conditions consistent with diamond growth, sinter to one another by form inter-diamond bonds between the diamond grains. The catalyst material accelerates the one of reaction of formation of the inter-diamond bonds between the diamond grains. The cell assembly and its contents are held above the melting or liquidus temperature of the catalyst material for a pre-determined amount of time that has been experimentally determined to ensure good sintering of the diamond grains of the polycrystalline diamond body.

Following the period of holding the cell assembly and its contents at elevated temperature, the temperature of the cell assembly and its contents are decreased below the melting or liquidus temperature of the catalyst material. In the conventional profile depicted in FIG. 5, the cell assembly is reduced in temperature to ambient temperature. As the molten catalyst material is reduced in temperature, carbon that is in solution in the catalyst material precipitates out of the catalyst material, and further bonds with the diamond grains of the polycrystalline diamond body.

Still referring to FIG. 5, a temperature profile of an HPHT process according to the present disclosure is depicted (labeled "Conditions B-D"). In one depicted embodiment (labeled "Condition B"), and similar to the conventional HPHT process, the cell assembly is subjected to increased pressure prior to or coincident with the application of increased temperature. The temperature of the cell assembly is raised to a temperature above the melting or liquidus temperature of the catalyst material that is present in the cell assembly. This is referred to as the first sintering temperature. At this temperature and pressure, the molten catalyst material is pushed into the unbonded diamond particles and into the interstitial pockets between the diamond particles.

Subsequent to reaching the sintering temperature, the temperature of the cell assembly and its contents undergo a temperature decrease, which is followed by a temperature increase back above the melting or liquidus temperature of the catalyst material. This temperature decrease and subsequent increase during the sintering phase of the HPHT cycle is referred to herein as an "intermediate quench." The intermediate quench allows for at least some of the material that is held in solution in the molten catalyst material to precipitate out of the catalyst material. Using dissolved carbon as an example, the intermediate quench may allow the carbon to come out of solution with the catalyst material and form diamond grains at locations within the volume of catalyst material or along the surface of the diamond grains. The precipitated diamond grains may be located at positions outside of the inter-bonded diamond grains that are found from the diamond particles that are introduced to the cup assembly before initiation of the HPHT process. The grains precipitated during the intermediate quench may nucleate on and be attached to the inter-bonded diamond grains that are formed from the diamond particles introduced into the cup assembly before the HPHT process.

In some embodiments, the rate of temperature decrease of the cell assembly and its contents during the intermediate quench may be greater than about 100° C. per minute, for example greater than about 200° C. per minute, for example greater than about 300° C. per minute, for example greater than about 400° C. per minute, for example greater than about 500° C. per minute, for example greater than about 600° C. per minute, for example greater than about 700° C. per minute, for example greater than about 800° C. per minute, for example being about 850° C. per minute. In some embodiments, the temperature to which the cell assembly and its contents are cooled to during the intermediate quench may be less than the melting or liquidus temperature of the catalyst material, for example, being at least about 10° C. less than the melting or liquidus temperature of the catalyst material, for example being at least about 20° C. less than the melting or liquidus temperature of the catalyst material for example being at least about 30° C. less than the melting or liquidus temperature of the catalyst material, for example being at least about 40° C. less than the melting or liquidus temperature of the catalyst material, for example being about 50° C. less than the melting or liquidus temperature of the catalyst material. The cell assembly and its contents may be maintained at a temperature lower than the melting or liquidus temperature of the catalyst material for at least about 5 seconds, for example at least about 10 seconds, for example at least about 20, for example at least about 30 seconds.

The intermediate quench may occur at various times during the HPHT process between points at which the cell assembly and its contents are held above the melting or liquidus temperature of the catalyst material. In one embodiment, the intermediate quench occurs in the first 67% of time that the cell assembly and its contents are held above the melting or liquidus temperature of the catalyst material, for example being in the first 50% of time that the cell assembly and its contents are held above the melting or liquidus temperature of the catalyst material, for example being in the first 33% of time that the cell assembly and its contents are held above the melting or liquidus temperature of the catalyst material. In some embodiments, the cell assembly and its contents may be subjected to multiple intermediate quenches during the time at elevated temperature (see "FIG. 5—Condition D"). For HPHT processes that include multiple intermediate quenches, the first intermediate quench occurs in the first 50% of time that the cell assembly and its contents are held above the melting or liquidus temperature of the catalyst material. The first intermediate quench may occur at a time after the molten catalyst material has been swept through the grains of superabrasive material and after the catalyst material has dissolved sufficient superabrasive material to reach a solubility limit of the catalyst material, where the catalyst material can dissolve no additional superabrasive material at the current temperature and pressure.

The cell assembly and its contents are subsequently re-heated to a temperature above the melting or liquidus temperature of the catalyst material. This temperature is referred to herein as the "second sintering temperature". In some embodiments, the cell assembly and its contents are maintained at a temperature that is lower than the melting or liquidus temperature of the catalyst material before being heated to the second sintering temperature. In other embodiments, the cell assembly and its contents are re-heated to the second sintering temperature.

The second sintering temperature may be selected to provide the desired diamond sintering and the interstitial diamond grain and metal carbide growth characteristics. In various embodiments, the second sintering temperature may be greater than (as depicted in "Condition C"), equal to, or less than (as depicted in "Condition B") the first sintering temperature. In various embodiments, the second sintering temperature may be in a range from about 20° C. to about 150° C. greater than the melting or liquidus temperature of the catalyst material. The first sintering temperature and the second sintering temperature may both be us to about the temperature at which diamond becomes unstable at the applied pressure of the HPHT process. Similar to the conventional HPHT profile discussed above, the diamond particles are maintained at temperature and pressure conditions consistent with diamond growth, such that the diamond particles can continue to sinter to one another and form inter-diamond bonds between the diamond grains. Further, with the temperature of the precipitated diamond grains and the catalyst material held above the sintering temperature, the precipitated diamond grains may grow due to further precipitation of carbon that is held in solution with the catalyst material. The time, temperature, and pressure conditions of the HPHT process can be selected to provide the desired rate of sintering reaction and resulting particle size of the interstitial diamond grains. Further, with the temperature of the inter-bonded diamond grains, the precipitated diamond grains and the catalyst material held above the sintering temperature, the diamond grains may plastically deform, rearranging the diamond grains during the HPHT process.

In the Condition B example of the HPHT process temperature profile depicted in FIG. 5, the cell assembly and its contents is initial pressurized and heated above the melting or liquidus temperature of the catalyst material at a first sintering temperature 402. The cell assembly and its contents is subjected to an intermediate quench 404 in which the temperature of the cell assembly decreases from the first sintering temperature 402 to a quench temperature 406 that is about 40° C. less than the melting or liquidus temperature 400 of the catalyst at a rate of about 850° C. per minute. The cell assembly and its contents are immediately re-heated to a second sintering temperature 408 that is about 100° C. colder than the first sintering temperature 402, but higher than the melting or liquidus temperature 400 of the catalyst material. The cell assembly and its contents are held below the melting or liquidus temperature 400 of the catalyst material for about 13 seconds. The cell assembly and its contents are maintained above the melting or liquidus temperature 400 of the catalyst material (at or approaching the second sintering temperature) for about 210 seconds. The cell assembly and its contents are subsequently cooled and allowed to return to ambient temperature.

In some embodiments, the precipitated diamond grains may form at positions proximate to the inter-bonded diamond grains. The precipitated diamond grains may be bonded to only one of the inter-bonded diamond grains or to other precipitated diamond grams, such that the precipitated diamond grains are therefore not part of the interconnected network of inter-bonded diamond grains. Instead, the precipitated diamond grains are interstitial diamond grains that are formed within the interstitial pockets between the inter-bonded diamond grains. Further, diamond grains may be formed within the interstitial pockets inside of a volume of catalyst material.

Note that the incorporation of the intermediate quench into the HPHT process allows for the formation of interstitial diamond grains and the interstitial metal carbides at positions within the interstitial pockets of the polycrystalline diamond body. Formation and growth control of the interstitial diamond grains and the interstitial metal carbides is not believed to have been previously accomplished using conventional HPHT sintering techniques.

Because the interstitial diamond grains are formed from diamond grains that are precipitated from the catalyst material during the HPHT process, diamond grains that precipitate and grow into the interstitial diamond grains may be relatively smaller in size as compared to inter-bonded diamond grains. During the intermediate quench, the carbon that is dissolved in the catalyst material comes out of solution and nucleates diamond grains at positions within the catalyst material. A rapid decrease in temperature of the cell assembly and its contents tends to precipitate diamond out of the catalyst material at positions that appear to be well distributed throughout the volume of catalyst material. The size of the interstitial diamond grains that result from the intermediate quench are typically small. In one example, the size of the interstitial diamond grains may be less than about 50% of the particle size of the inter-bonded diamond grains. In contrast, the inter-bonded diamond grains are introduced to the cell assembly as diamond grains. The inter-bonded diamond grains may reduce in size during the HPHT process because the catalyst material dissolves and repositions some of the carbon from the diamond grains. Reducing the size of the diamond feed stock that is deposited into the cell assembly and then following conventional HPHT process parameters may not result in equivalent particles sizes of the inter-bonded diamond grains and the interstitial diamond grains because finer diamond feed stock tends to result in growth of the inter-bonded diamond grains.

In some embodiments, the interstitial diamond grains may be positioned to contact portions of the surfaces of the plurality of inter-bonded diamond grains that face the interstitial pockets of the polycrystalline diamond body. The interstitial diamond grains may, therefore, reduce the surfaces area of the inter-bonded diamond grains that are in contact with the catalyst material following the HPHT process. Maintaining spacing between the inter-bonded diamond grains and the catalyst material following the HPHT process may increase the thermal stability of the polycrystalline diamond body by reducing the reaction rate of back-conversion of diamond into non-diamond allotropes of carbon when the polycrystalline diamond body is subjected to conditions of elevated temperature at ambient pressure conditions. Therefore, she incorporation of the interstitial diamond grains at positions that reduce the surface area of the inter-bonded diamond grains in contact with the catalyst material may improve the thermal stability of the polycrystalline diamond body.

The interstitial diamond grains that are positioned within the interstitial pockets of the polycrystalline diamond body between the inter-bonded diamond grains may reduce the volume of catalyst material that may be positioned within the interstitial region. Stress may be introduced to the polycrystalline diamond body due to the mismatch in coefficients of thermal expansion between the inter-bonded diamond grains and the catalyst material. By reducing the volume of catalyst material that is present in these interior interstitial pockets, the magnitude of relative growth of the catalyst material as compared to the inter-bonded diamond grains may be reduced because of the decrease in volume of the catalyst material volume. Stress that may be introduced to the interconnected network of inter-bonded diamond grains by the catalyst material may be similarly reduced because of the reduced volume of catalyst material to exert force onto the adjacent diamond grains. Therefore, the incorporation of the interstitial diamond grains at positions inside the interstitial volume and surrounded by catalyst material may improve the thermal stability of the polycrystalline diamond body.

While the discussion above has been made with respect to interstitial diamond grains that are precipitated during the HPHT process, it should be understood that similar phenomenon may occur with respect to interstitial metal carbides. Interstitial metal carbides may be similarly dissolved in the molten catalyst material, positioned within the interstitial pockets of the polycrystalline diamond body, precipitate during the intermediate quench, and grow during the subsequent time spent at the sintering temperature. The interstitial metal carbides may, similarly to the interstitial diamond grains, be positioned proximate to the surfaces of the inter-bonded diamond grains or within the interstitial pockets surrounded by catalyst material.

The interstitial metal carbides that are positioned along the surfaces of the inter-bonded diamond grains may reduce the surface area of the inter-bonded diamond grains that are in contact with the catalyst material following the HPHT process. Maintaining spacing between the inter-bonded diamond grains and the catalyst material following the HPHT process may increase the thermal stability of the polycrystalline diamond body by decreasing the reducing a reaction rate of back-conversion of diamond into non-diamond allotropes of carbon when the polycrystalline diamond body is subjected to conditions of elevated temperature at ambient pressure conditions. Therefore, the incorporation of the interstitial metal carbides at positions that reduce the surface area of the inter-bonded diamond grains in contact with the catalyst material may improve the thermal stability of the polycrystalline diamond body.

The interstitial metal carbides that are positioned within the interstitial pockets of the polycrystalline diamond body between the inter-bonded diamond grains may reduce the volume of catalyst material that may be positioned within the interstitial region. As discussed above, stress may be introduced to the polycrystalline diamond body due to the mismatch in coefficients of thermal expansion between the inter-bonded diamond grains and the catalyst material. The incorporation of interstitial diamond grants (having a coefficient of thermal expansion that is essentially equal to the inter-bonded diamond grains) that displaces catalyst material (having a coefficient of thermal expansion that is greater than the inter-bonded diamond grains) from the interstitial pockets, increasing the temperature of the polycrystalline diamond body results in less growth of the material in the interstitial pockets as compared to conventional polycrystalline diamond bodies. By reducing the volume of catalyst material that is present in these interior interstitial pockets, the magnitude of relative growth of the catalyst material as compared to the inter-bonded diamond grains may be reduced because of the decrease in amount of the catalyst material volume. Stress that may be introduced to the interconnected network of inter-bonded diamond grains by the catalyst material may be similarly reduced because of the reduced volume of catalyst material to exert force onto the adjacent diamond grains.

Additionally, the interstitial diamond grains and interstitial metal carbides formed in the interstitial pockets may have minimal structural inter-bonding, such that the interstitial diamond grains and the interstitial metal carbides have reduced tensile strength as compared to the inter-bonded diamond grains. Without being bound by theory, it is hypothesized that when the polycrystalline diamond body is subjected to elevated temperatures, stress introduced by the mismatch in thermal expansion between the diamond grains, the metal carbides, and the catalyst material may preferentially crack or deform the interstitial diamond grains and/or the interstitial metal carbides, such that the stress of the mismatch in thermal expansion directed into the inter-bonded diamond grains is dissipated. Therefore, the incorporation of the interstitial metal carbides at positions inside the interstitial volume and surrounded by catalyst material may improve the stability of the polycrystalline diamond body at elevated temperatures. The interstitial diamond grains may exhibit smaller grain sizes than the inter-bonded diamond grains, for example being less than about 20% of the size of the inter-bonded diamond grains. Because the interstitial diamond grains are nucleated and grow during the HPHT sintering process, and are not introduced as diamond grains prior to the HPHT sintering process, the size that the interstitial diamond grains reach may be limited.

Figure 6:
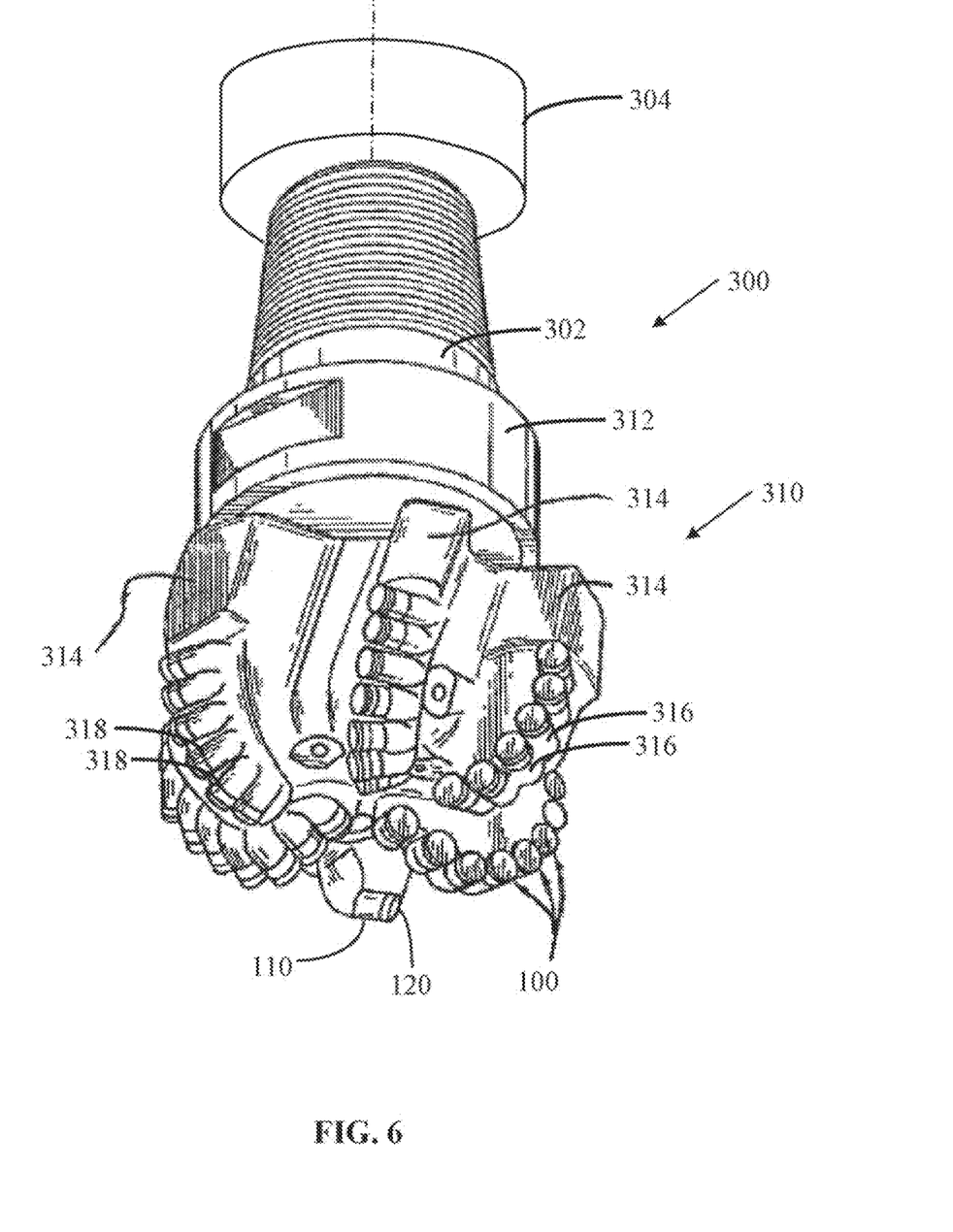
FIG. 6 is a schematic perspective view of a drill bit having a plurality of PCD compacts according to one or more embodiments shown or described herein.

Referring now to FIG. 6, a plurality of PCD compacts 100 according to the present disclosure may be installed in a drill bit 310, as conventionally known, to perform a downhole drilling operation. The drill bit 310 may be positioned on a drilling assembly 300 that includes a drilling motor 302 that applies torque to the drill bit 310 and an axial drive mechanism 304 that is coupled to the drilling assembly for moving the drilling assembly 300 through a borehole 60 and operable to modify the axial force applied by the drill bit 310 in the borehole 60. Force applied to the drill bit 310 is referred to as "Weight on Bit" ("WOB"). The drilling assembly 300 may also include a steering mechanism that modifies the axial orientation of the drill assembly 300, such that the drill bit 310 can be positioned for non-linear downhole drilling.

The drill bit 310 includes a stationary portion 312 and a material removal portion 314. The material removal portion 314 may rotate relative to the stationary portion 312. Torque applied by the drilling motor 302 rotates the material removal portion 314 relative to the stationary portion 312. A plurality of PCD compacts 100 according to the present disclosure are coupled to the material removal portion 314. The plurality of PCD compacts 100 may be coupled to the material removal portion 314 by a variety of conventionally known methods, including attaching the plurality of PCD compacts 100 to a corresponding plurality of shanks 316 that are coupled to the material removal portion 314. The PCD compacts 100 may be coupled to the plurality of shanks 316 by a variety of methods, including, for example, brazing, adhesive bonding, or mechanical affixation. In embodiments in which the PCD compacts 100 are brazed to the shanks 316 with a braze filler 318, at least a portion of the shanks 316, the braze filler 318, and at least a portion of the substrate 110 of the PCD compacts 100 is healed to an elevated temperature while in contact with one another. As the components decrease in temperature, the braze filler 318 solidifies and forms a bond between the substrate 110 of the PCD compacts 100 and the sharks 316 of the material removal portion 314. In one embodiment, the brazing filler 318 has a melting temperature that is greater than a melting temperature of the non-catalytic material 92 of the polycrystalline diamond body 120 at ambient pressure conditions. In another embodiment, the brazing filler 318 has a melting temperature that is less than the catalytic material 94 of the polycrystalline diamond body 120 at ambient pressure conditions. In yet another embodiment, the brazing filler 318 has a melting temperature that is less than the liquidus temperature of the catalytic material 94 of the polycrystalline diamond body at ambient pressure conditions.

When the drill bit 310 is positioned in the borehole 60, the material removal portion 314 rotates about the stationary portion 312 to reposition the PCD compacts 100 relative to the borehole 60, thereby removing surrounding material from the borehole 60. Force is applied to the drill bit 310 by the axial drive mechanism 304 in generally the axial orientation of the drill bit 310. The axial drive mechanism 304 may increase the WOB, thereby increasing the contact force between the PCD compacts 100 and the material of the borehole 60. As the material removal portion 314 of the drill bit 310 continues to rotate and WOB is maintained on the drill bit 310, the PCD compacts 100 abrade material of the borehole 60, and continue the path of the borehole 60 in an orientation that generally corresponds to the axial direction of the drill bit 310.

EXAMPLES

Comparative Example 1

PCD compacts were made according to a conventional manufacturing process. Diamond particles having a mean particle size of 17 μm were positioned in a refractory metal cup. A cemented tungsten carbide substrate having a cobalt content of about 12 wt. % was seated in the refractory metal cup to enclose the diamond particles, thereby forming a cup assembly. The cup assembly was installed in a belt-type press and subjected to a HPHT sintering process having a maximum pressure of about 7.8 GPa, a maximum temperature of about 1500° C., and a time above the melting temperature of cobalt of about 240 seconds. The sintered polycrystalline compact was recovered from the HPHT process and processed through a series of finishing operations to product a PCD compact having a cylindrical shape of nominally 16 mm in diameter and 8 mm in thickness, a flat working surface, and a chamber transition between the flat working surface and the cylindrical outer surface of the PCD compact. The PCD compact was subjected to a leaching process in which the polycrystalline diamond body was maintained in contact with a leaching agent to remove substantially all catalyst material from a portion of the interstitial pockets of the polycrystalline diamond body to a depth of about 80 μm from the working surface of the PCD compact.

Figure 7:
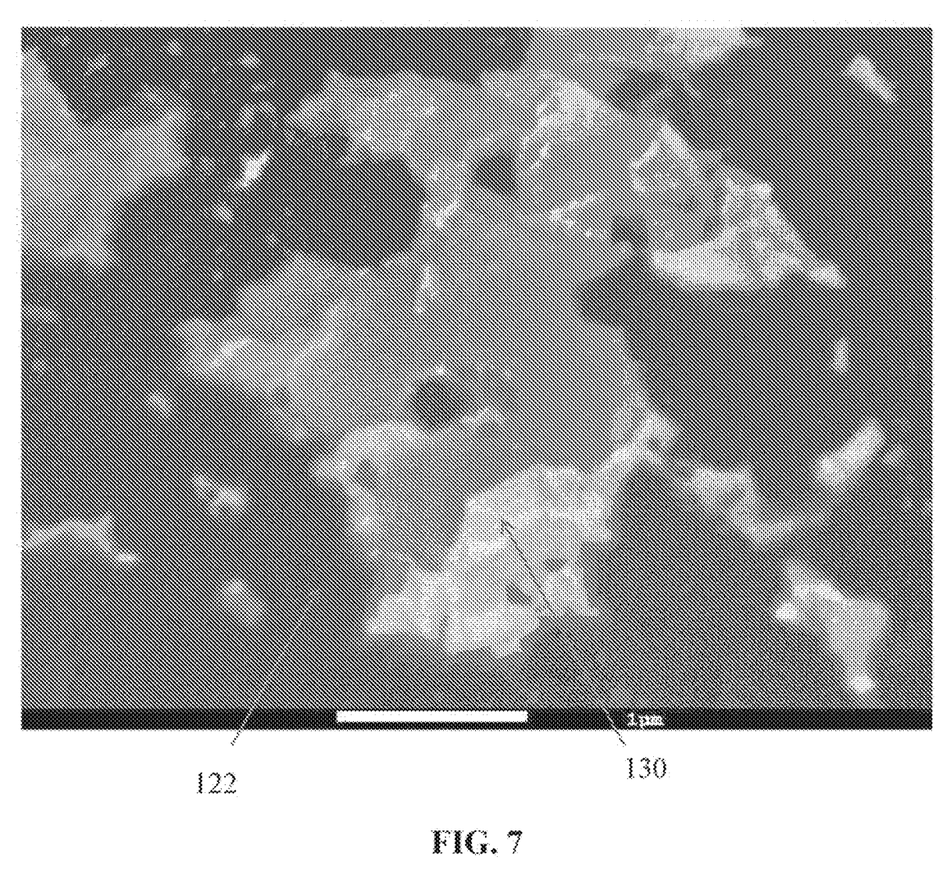
FIG. 7 is a photomicrograph of the microstructure of a PCD compact made according to Example 1.

A PCD compact produced according to the above-referenced parameters was sectioned and inspected by scanning electron microscopy to evaluate the microstructure of the PCD compact. A micrograph gathered with a scanning electron microscope of the PCD compact is depicted in FIG. 7. The PCD compact exhibited conventional microstructure having a plurality of inter-bonded diamond grains forming an interconnected network and interstitial pockets between the diamond grains that were filled with catalyst material and metal carbides or were substantially free of catalyst material. As depicted in the micrograph of FIG. 7, the microstructure of the PCD compact includes diamond crams (dark grey) that are inter-bonded with one another and interstitial volume that is filled with non-diamond material (light grey). The dark grey regions within the pool of non-diamond material is believed to be diamond that is part of the continuous matrix of diamond material, but is not depicted as being inter-bonded with surrounding diamond because of the location and orientation of where the sample was separated and prepared. The remaining material in the interstitial volume is generally uniform in appearance, which is consistent with no diamond or tungsten grain growth in the non-diamond material during the HPHT sintering process.

Figure 9:
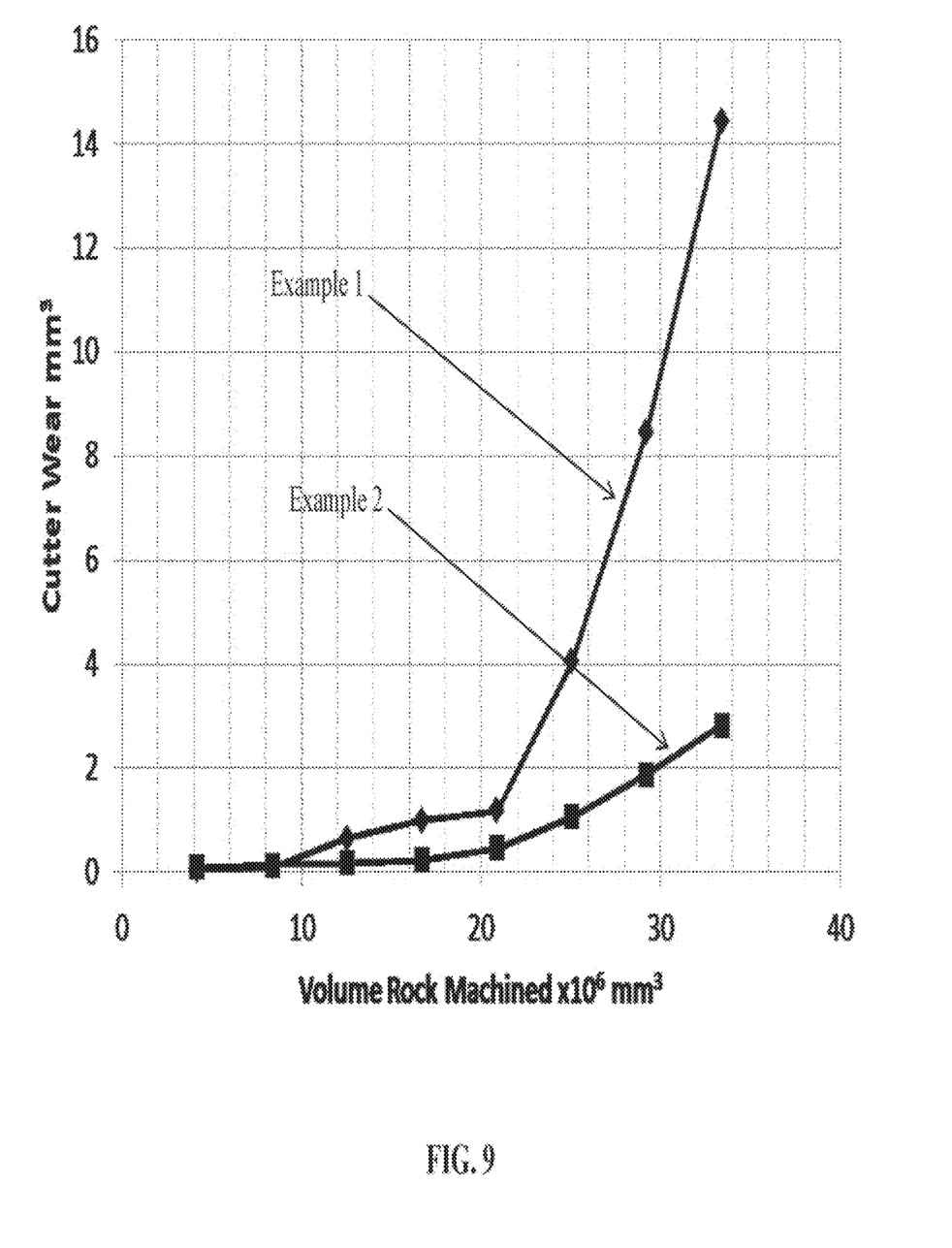
FIG. 9 is a schematic representation of the wear rate of the PCD compacts according to Examples 1 and 2.

A PCD compact was tested in laboratory tests to replicate a downhole drilling application. The PCD compact was held in a vertical turret lathe ("VTL") to machine a granite workpiece. The PCD compact was positioned to maintain a depth of cut of about 0.010 inches/pass at a cross-feed rate of about 0.17 inches/revolution and the workpiece rotating at about 60 RPM (such that the surface removal rate of the workpiece varied over the diameter of the workpiece) and a backrake angle of 15 degrees. The selected parameters of the VTL test measure a combination of abrasion resistance and thermal stability of the PCD compact. The PCD compact was water cooled. The VTL test introduces a wear scar into the PCD compact along the position of contact between the PCD compact and the granite. The size of the water scar is compared to the material removed from the granite to evaluate the abrasion resistance of the PCD compact. The service life of the PCD compact may be calculated based on the material removed from the granite as compared to the size of the wear scar abrades through the polycrystalline diamond body and into the substrate. A plot of granite material removed corresponding to the size of the wear scar of the PCD compact (and representing wear rate of the PCD compact) is depicted in FIG. 9.

Example 2

PCD compacts were made using an HPHT sintering process described herein. Diamond particles having a mean particle size of 17 μm were positioned in a refractory metal cup. A cemented tungsten carbide substrate having a cobalt content of about 12 wt. % was seated in the refractory metal cup to enclose the diamond particles, thereby forming a cup assembly. The cup assembly was installed in a belt-type press and subjected to a HPHT sintering process. The HPHT sintering process had a maximum pressure of about 7.8 GPa and a maximum temperature of about 1500° C., the same conditions as those used in Example 1. The cell assembly and its contents were heated to the maximum temperature and held for about 60 seconds. The cell assembly and its contents were subjected to an intermediate quench that decreased the temperature to less than the liquidus temperature of cobalt over a time of about 15 seconds. The cell assembly was subsequently heated above the liquidus temperature of cobalt and held at this temperature for about 160 seconds. The cell assembly was subsequently cooled and allowed to return to ambient temperature.

The sintered polycrystalline compact was recovered from the HPHT process and processed through a series of finishing operations to produce a PCD compact having a cylindrical shape a cylindrical shape of nominally 16 mm in diameter and 8 mm in thickness, a flat working surface, and a chamfer transition between the flat working surface and the cylindrical outer surface of the PCD compact. The PCD compact was subjected to a leaching process in which the polycrystalline diamond body was maintained in contact with a leaching agent to remove substantially all catalyst material from a portion of the interstitial pockets of the polycrystalline diamond body to a depth of about 80 μm from the working surface of the PCD compact.

Figure 8:
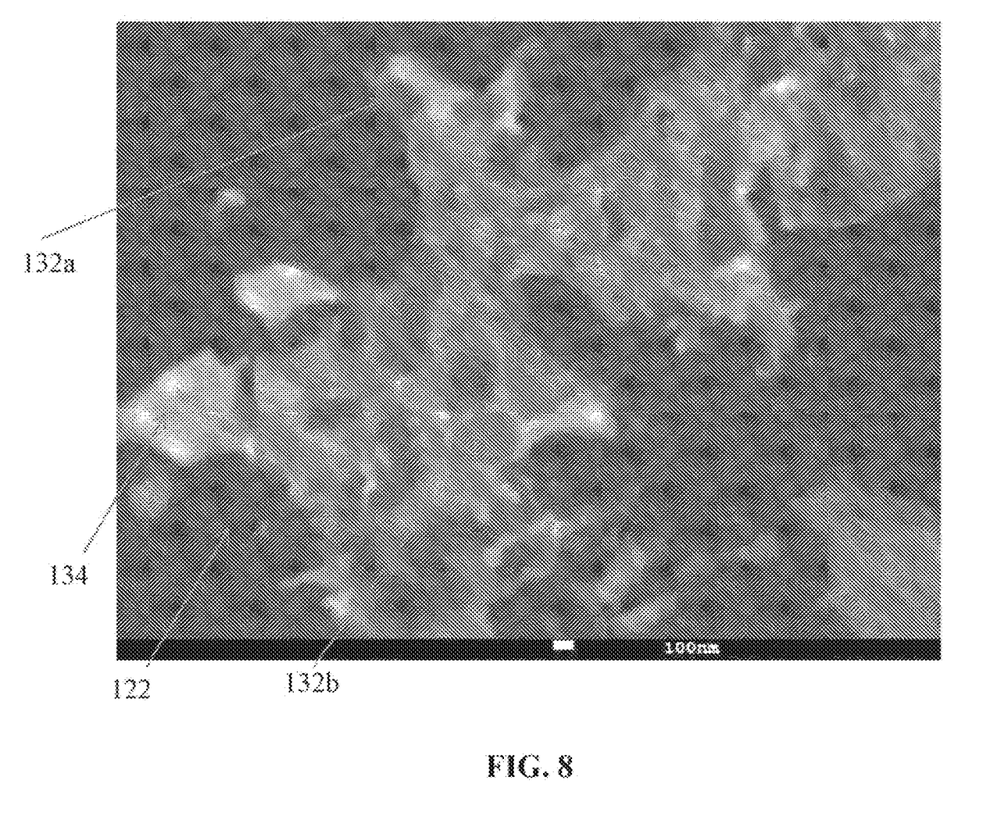
FIG. 8 is a photomicrograph of the microstructure of a PCD compact made according to Example 2.

A PCD compact produced according to the above-referenced parameters was sectioned and inspected by scanning electron microscopy to evaluate the microstructure of the PCD compact. A micrograph gathered with a scanning electron microscope of the PCD compact is depicted in FIG. 8. The PCD compact exhibited microstructure that varied from the microstructure of comparative Example 1. The microstructure of Example 2 included a plurality of inter-bonded diamond pains and a plurality of interstitial pockets between the inter-bonded diamond grains. The microstructure also included a plurality of interstitial diamond grains that were attached to various inter-bonded diamond grains along surfaces that faced the interstitial pockets. The interstitial diamond grains typically exhibited smaller grain sizes than the inter-bonded diamond grains, for example being less than about 20% of the size of the inter-bonded diamond grains.

The microstructure also included a plurality of interstitial diamond grains and a plurality of interstitial metal carbides 134 that were positioned within the interstitial pockets and surrounded by cobalt.

A PCD compact was tested in laboratory tests to replicate a downhole drilling application. The PCD compact was held in VTL to machine the granite workpiece according to the parameters disclosed above with respect to the testing of the PCD compacts of Example 1. A plot of granite material removed corresponding to the size of the wear scar of the PCD compact (and representing wear rate of the PCD compact) is depicted in FIG. 9.

As depicted in FIG. 9, the compact of Example 2 that included the interstitial diamond grains exhibited a substantially better wear rate than the compact of Example 1 that was produced with a conventional HPHT process.

It should now be understood that PCD compacts according to the present disclosure include interstitial diamond grains and/or interstitial metal carbides that are positioned within the interstitial pockets between the inter-bonded diamond grains. The interstitial diamond grains and/or the interstitial metal carbides decrease the volume of catalyst material that remains in the interstitial volume and may be positioned along the surfaces of the inter-bonded diamond grains and reduce the exposed surface area of the inter-bonded diamond grains that are in contact with the catalyst material. The interstitial diamond grains and/or the interstitial metal carbides may improve the thermal stability of the polycrystalline diamond body of the PCD compact.

The invention claimed is:

1. A polycrystalline diamond compact consisting of:
   optionally, a substrate; and
   a polycrystalline diamond body attached to the substrate, the polycrystalline diamond body consisting of:
      a plurality of inter-bonded diamond grains that are attached to one another in an interconnected network of diamond grains and interstitial pockets between the inter-bonded diamond grains,
      one or both of a catalyst material and a non-catalyst material positioned between the inter-bonded diamond grains in at least a portion of the interstitial pockets,
      optionally grains of hard metal carbide positioned in at least a portion of the interstitial pockets, and
      a plurality of interstitial diamond grains that are positioned in the interstitial pockets consisting of a first fraction and a second fraction,
   wherein each interstitial diamond grain in the first fraction of the plurality of interstitial diamond grains is attached to a single diamond grain of the interconnected network of diamond grains or to other of the interstitial diamond grains in the first fraction of the plurality of interstitial diamond grains, and
   wherein each interstitial diamond grain in the second fraction of the plurality of interstitial diamond grains is spaced apart from the inter-bonded diamond grains and surrounded by catalyst material.

2. The polycrystalline diamond compact of claim 1, wherein the plurality of interstitial diamond grains reduce an exposed surface area of the inter-bonded diamond grains to the catalyst material.

3. The polycrystalline diamond compact of claim 1, wherein the plurality of interstitial diamond grains are precipitated from dissolved carbon in the catalyst material during a HPHT process.

4. The polycrystalline diamond compact of claim 1, wherein at least a portion of the interstitial pockets are substantially free of catalyst material.

5. The polycrystalline diamond compact of claim 1, wherein the interstitial diamond grains have a particle size that is less than 50% of the particle size of the inter-bonded diamond grains.

6. A method for forming the polycrystalline diamond compact according to claim 1, the method comprising:
   positioning grains of superabrasive material and a catalyst material in a cell assembly;
   elevating a temperature of the components of the cell assembly to a first superabrasive sintering temperature that is above a melting or liquidus temperature of the catalyst material;
   subsequent to reaching the first superabrasive sintering temperature, decreasing the temperature of the components of the cell assembly to a quench temperature that is below the liquidus temperature of the catalyst material; and
   subsequent to reaching the quench temperature, elevating the cell temperature to a second sintering temperature that is above the melting or liquidus temperature of the catalyst material.

7. The method of claim 6, wherein the rate of change of the temperature of the components of the cell assembly from the first superabrasive sintering temperature to the quench temperature is greater than about 400'C per minute.

8. The method of claim 6, wherein the rate of change of the temperature of the components of the cell assembly from the first sintering temperature to the quench temperature is greater than about 600° C. per minute.

9. The method of claim 6, wherein the components of the cell assembly are maintained below the melting or liquidus temperature of the catalyst material for at least about 5 seconds.

10. The method of claim 6, wherein the temperature of the components of the cell assembly is decreased from the first sintering temperature to the quench temperature in less than about 30 seconds.

11. The method of claim 6, wherein the temperature of the components of the cell assembly is maintained above the melting or liquidus temperature of the catalyst material for a period of time sufficient for the molten catalyst material to sweep through the grains of superabrasive material and reach a solubility limit of the catalyst material before the temperature of the components of the cell assembly is decreased to the quench temperature.

12. The method of claim 6, wherein the superabrasive material is diamond, and wherein the catalyst material is a metal in Group VIII of the Periodic Table.

13. The method of claim 6, further comprising introducing a polycrystalline diamond body of the polycrystalline diamond compact to a leaching process in which catalyst material is removed from at least portions of interstitial pockets between inter-bonded diamond grains.

14. The polycrystalline diamond compact of claim 1, wherein the substrate is cemented tungsten carbide-cobalt (WC-Co).

15. The polycrystalline diamond compact of claim 1, wherein the substrate is cemented tungsten carbide, cemented tantalum carbide, or cemented titanium carbide.

16. The polycrystalline diamond compact of claim 1, wherein non-catalyst material is one or more selected from the group consisting of metals, metal alloys, metalloids, metal-organic composites, semiconductors, low melting temperature metal oxides, glass, and combinations thereof.

* * * * *